US005249907A

United States Patent [19]

Poten et al.

[11] Patent Number: 5,249,907

[45] Date of Patent: Oct. 5, 1993

[54] DOLLY SERVING AS A TRAVELING AID FOR A DEFECTIVE WHEEL OF A MOTOR VEHICLE

[75] Inventors: Peter-Randolf Poten, Marmagen; Karl Steffens, Dahlem; Gunther Gebhardt, Stadtkyll, all of Fed. Rep. of Germany

[73] Assignee: DIEHL GmbH & Co., Nuremberg, Fed. Rep. of Germany

[21] Appl. No.: 886,768

[22] Filed: May 21, 1992

[30] Foreign Application Priority Data

May 21, 1991 [DE] Fed. Rep. of Germany ....... 4116479

[51] Int. Cl.[5] .............................................. B60B 30/10

[52] U.S. Cl. ................................ 414/430; 280/43.11; 280/79.4

[58] Field of Search ............... 414/430, 537; 280/79.4, 280/62, 43.11

[56] References Cited

U.S. PATENT DOCUMENTS

| | | | |
|---|---|---|---|
| 1,171,808 | 2/1916 | Siberell | 280/79.4 X |
| 1,419,067 | 6/1922 | McCarthy | 414/430 |
| 2,247,717 | 7/1941 | Sutter | 414/430 |
| 2,350,118 | 5/1944 | Knapp | 414/430 |
| 2,358,864 | 9/1944 | Lockwood | 414/430 |
| 2,414,383 | 1/1947 | Merriam | 414/430 |
| 2,552,804 | 5/1951 | Morris | 414/430 |
| 2,607,607 | 8/1952 | Day | 414/430 X |
| 3,145,860 | 8/1964 | Graves | 414/430 |
| 3,921,740 | 11/1975 | Forster | 180/907 X |
| 4,726,727 | 2/1988 | Tyler | 414/430 |
| 4,913,459 | 4/1990 | Smeitink | 414/430 X |
| 5,039,123 | 8/1991 | Smeitink | 414/430 X |

FOREIGN PATENT DOCUMENTS

| | | | |
|---|---|---|---|
| 0334852 | 11/1903 | France | 280/79.4 |
| 2516022 | 5/1983 | France | 414/430 |
| WO91/06437 | 4/1991 | World Int. Prop. O. . | |

*Primary Examiner*—Michael S. Huppert
*Assistant Examiner*—James W. Keenan
*Attorney, Agent, or Firm*—Scully, Scott, Murphy & Presser

[57] ABSTRACT

A dolly or roll carriage which is utilized to serve as a traveling aid for a defective wheel of a motor vehicle. The dolly includes a traveling frame which is equipped with wheels, a ramp plate for the driving thereonto of the wheel, a well for the receipt and for the sideways fixing in position of the wheel and a front stop member for the wheel, whereby the stop member is generally constructed in the shape of a wheel rim.

2 Claims, 1 Drawing Sheet

DOLLY SERVING AS A TRAVELING AID FOR A DEFECTIVE WHEEL OF A MOTOR VEHICLE

BACKGROUND OF THE INVENTION

1. Field of the Invention

The present invention relates to a dolly or roll carriage which is utilized to serve as a traveling aid for a defective wheel of a motor vehicle, with the dolly including a traveling frame which is equipped with wheels, a ramp plate for the driving thereonto of the wheel, a well for the receipt and for the sideways fixing in position of the wheel and a front stop member for the wheel, whereby the stop member is generally constructed in the shape of a wheel rim.

2. Discussion of the Prior Art

A dolly or roll carriage of that type is, in general, known from the disclosure of French Patent 25 16 022. on a traveling frame which is equipped with three wheels there is provided a ramp plate for the driving thereonto of the defective wheel of a motor vehicle, as well as a well for the receipt and for the sideways positioning of the wheel, and a front contact or stop member for the wheel. The ramp plate, in its downwardly pivoted position, has its side plates located on the ground so that, during the driving of the defective wheel onto the ramp plate, the dolly will be braked in place. Notwithstanding the foregoing, it can occur that the dolly may possibly be displaced at the beginning of the driving on of the wheel due to the presence of a step between the ramp plate and the ground. As a consequence thereof, either the driving onto the ramp plate by the wheel is no longer possible, or the dolly has shifted itself in its position relative to the wheel, such that the well is no longer in alignment with the vehicle wheel which is to be received therein.

SUMMARY OF THE INVENTION

Accordingly, it is an object of the present invention to provide a dolly or roll carriage of the type described which is reliably braked with regard to its position during the driving thereonto by the wheel of a motor vehicle. Moreover, the dolly should enable the vehicle to travel either forwardly as well as rearwardly in reverse.

The invention attains the foregoing object through the features as described hereinabove in that the traveling frame and the front stop member is formed by the well, wherein four rollers which extend towards the roadway are mounted on the well, in which the ramp plate is supported on the well by means of trunnions, an automatically operating brake which is actuated by the wheel being provided on the dolly, and the dolly further includes a clamping band longitudinally extending over the wheel, and which incorporates a clamping device.

Inventively, the dolly, during the driving thereonto by the defective wheel, can be safely manipulated and is not subject to any problems on being mounted on either the front or the rear axle of a motor vehicle. Moreover, it is also adapted for use with front wheel-drive motor vehicles. During the rearward or reverse travel of the motor vehicle there is afforded assurance that the defective wheel will no longer jump out of the dolly. Even upon encountering larger obstructions, such as sidewalk edges, street car tracks or railway crossings, will the dolly remain fixedly connected with the defective wheel. Also in the presence of loose sand or gravel, is the dolly capable of remaining operational, whereby the dolly functions in the manner of a sled; in essence, the rollers extending towards the roadway act as sled runners.

BRIEF DESCRIPTION OF THE DRAWINGS

Reference may now be had to the following detailed description of an exemplary embodiment of the invention, taken in conjunction with the accompanying drawings; in which.

DETAILED DESCRIPTION

Figure 1:
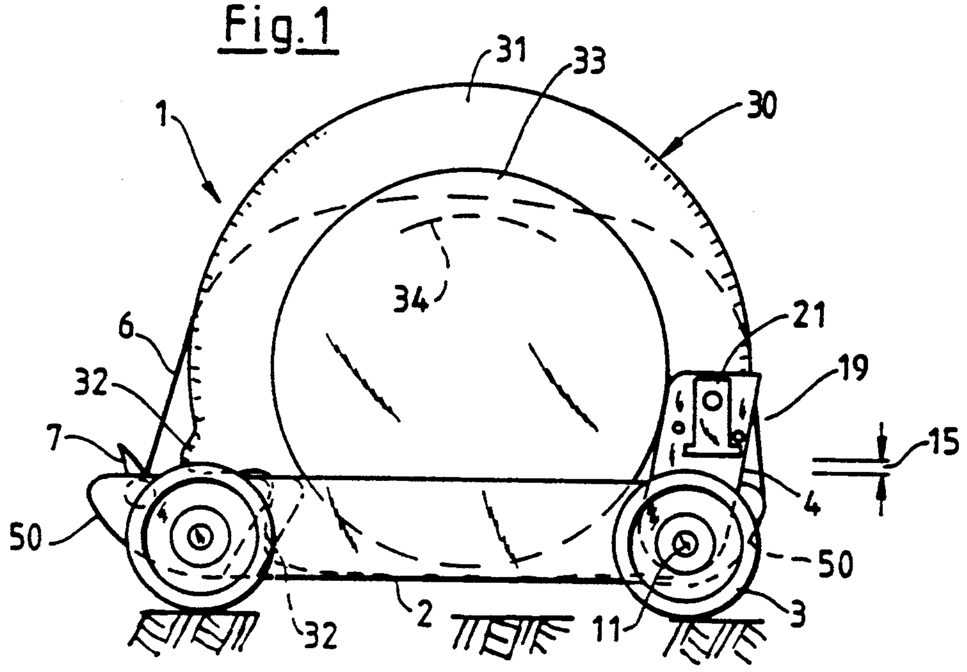
FIG. 1 illustrates a dolly or roll carriage supporting a defective motor vehicle wheel, shown in a side elevational view.

A dolly or carriage 1 includes a trough-shaped well 2 consisting of sheet metal, and possesses four rollers 3 extending towards the roadway and which are supported on the dolly by means of trunnions 8, a ramp plate 4, a front stop member 5, and a clamping band 6 with a clamping device 7.

The ramp plate 4 is in a U-shaped configuration through the incorporation of angled side plates 10, and is pivotably supported directly above a roller axle 11 towards the end facing the receipt of the wheel by means of trunnions 12 which are supported in the well.

Pivotably supported on the outside of the side plates 10 by means of trunnions 20 are the brake shoes 21 of a brake, identified by reference numeral 19, which is located between stops 22. These brake shoes 21, due to the eccentric support with respect to the trunnions 12 relative to the roller axle 11, in the upwardly swung position of the ramp plate 4 provide for an open space or gap 15 with respect to the rollers 3.

Figure 2:
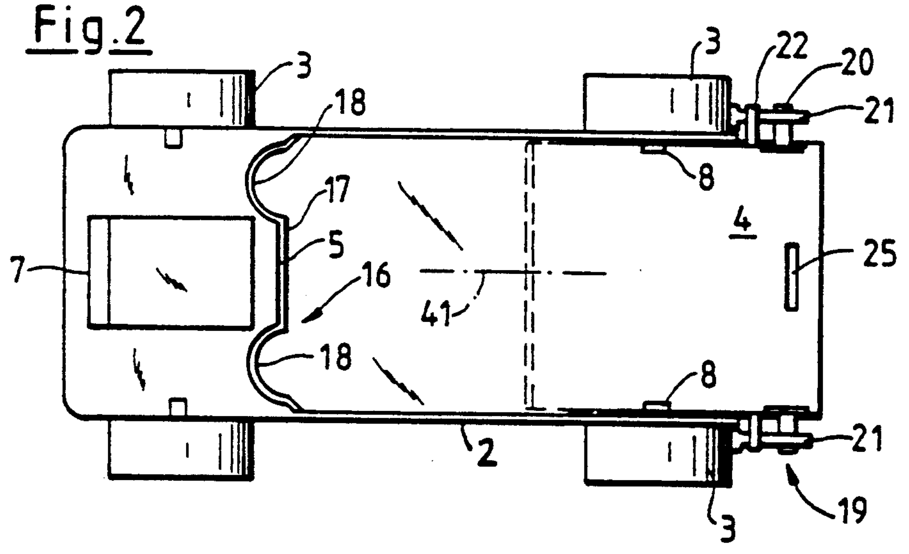
FIG. 2 illustrates that the dolly without the wheel, shown in a top plan view.
Figure 3:
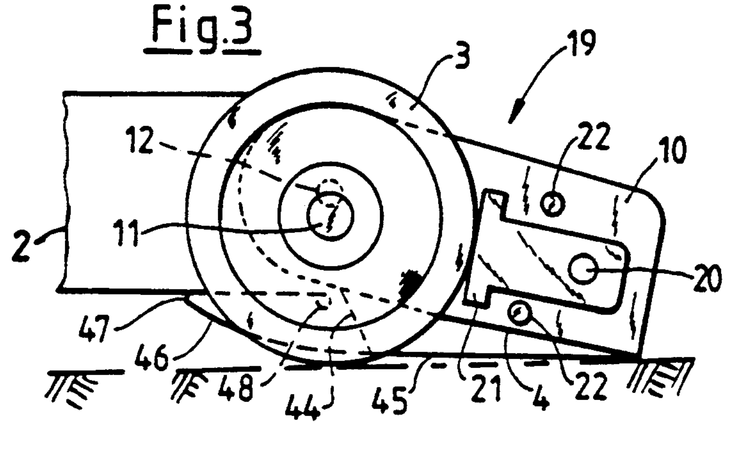
FIG. 3 illustrates a braking device pursuant to FIGS. 1 and 2.

In the downwardly swung position of the ramp plate 4; as illustrated in FIGS. 2 and 3, the brake shoes 21 fix in place the rollers 3 which are located towards the side which receives the vehicle wheel. As a result thereof, it is readily possible to have a defective wheel 30 drive onto the ramp plate 4, to roll over the latter, and then to drive into the trough-shaped well 2, as shown in FIG. 1. Thereby, the wheel cover 31 positions itself against the stop member 5 in conformance with the beads 32, and thus serves to provide for a forwardly closely-fitted fixing in place of the defective wheel 30. The contact or stop member 5, in conformance with a rim 33 of the wheel 30, possesses a W-shaped contour 16 with a straight central web 17 and two semi-circularly shaped bulges 18.

For effectuating the rear fixing of the wheel 30, the ramp plate 4 is swung upwardly. A clamping band 26 is hooked on the ramp plate 4 across a slot 25. The clamping band 26 is selectively releasable and tensionable by means of a clamping device 7 which is arranged on the well 2. The clamping band 26 is initially located over the middle of the wheel 30 in conformance with a centerline 41. By means of the clamping device 7 which is then actuated, the clamping band 26, as shown in FIG. 1, is clamped up to close to the bottom 34 of the rim 33. In consequence thereof, the vehicle wheel 30 is fixedly seated in the dolly 1.

Fastened on the outside to the ramp plate 4 is a plate 45 consisting of spring steel. This spring steel plate 45 extends over the entire width of the ramp plate 4 and through the intermediary of an interconnecting plate 44 is supported on the ramp plate 4. The spring steel plate 45 is constructed so as to be bent at 46 and possesses a channel 47. This channel 47 hooks into a channel 48 which is formed on the well 2 in a close form-fitted connection therewith, and thereby forms a sled contour 50, such as is also provided at the front end of the dolly 1.

The dolly 1 is constructed in such a manner that instead of the described embodiment consisting of sheet metal, it can be also be completely produced from a suitable plastic material, or in essence, a fiber-reinforced plastic material. The advantages thereof lie in the low weight and the reduced manufacturing costs. In the construction from a plastic material, the highly stressed components, such as the bearings for the rollers and the brake lever, can be constructed from metal.

What is claimed is:

1. In a dolly serving as a traveling aid for a defective wheel of a motor vehicle, said dolly including a well equipped with rollers for receiving and laterally positioning the defective wheel, a ramp plate for the driving thereonto of the defective wheel and a front stop member for the wheel, the improvement comprising: said stop member being formed by said well and having a W-shaped contour in the configuration of a wheel rim, a straight connecting web formed by two bulges adjacent thereto, and a clamping band on said dolly longitudinally extending over the wheel and including a clamping device for selectively releasing and tensioning said band.

2. A dolly as claimed in claim 1, including an automatic brake actuatable by the presence of the defective wheel on the dolly, wherein said brake comprises two brake shoes pivotably supported at the sides of the ramp plate, said ramp plate being pivotably supported directly above an axle for the rollers which are on the end of the well where the defective wheel is driven onto the ramp plate.

* * * * *